US011812330B2

(12) United States Patent
Grube et al.

(10) Patent No.: US 11,812,330 B2
(45) Date of Patent: *Nov. 7, 2023

(54) PROVIDING STATUS OF USER DEVICES ASSOCIATED WITH A BIOHAZARD

(71) Applicant: The Safety Network Partnership, LLC, Barrington, IL (US)

(72) Inventors: Gary W. Grube, Barrington Hills, IL (US); Evan Edward Quisenberry, Berkley, MI (US); John Edward Buchalo, South Barrington, IL (US)

(73) Assignee: The Safety Network Partnership, LLC, Barrington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,956

(22) Filed: Feb. 17, 2023

(65) Prior Publication Data

US 2023/0199429 A1    Jun. 22, 2023

Related U.S. Application Data

(63) Continuation of application No. 17/493,997, filed on Oct. 5, 2021, now Pat. No. 11,601,777, which is a
(Continued)

(51) Int. Cl.
| | |
|---|---|
| *H04W 4/021* | (2018.01) |
| *H04W 8/22* | (2009.01) |
| *H04W 4/90* | (2018.01) |
| *H04M 1/72421* | (2021.01) |
| *H04L 51/52* | (2022.01) |
| *H04L 51/222* | (2022.01) |

(Continued)

(52) U.S. Cl.
CPC ........ *H04W 4/021* (2013.01); *H04L 12/1895* (2013.01); *H04L 51/222* (2022.05); *H04L 51/52* (2022.05); *H04M 1/72421* (2021.01); *H04W 4/023* (2013.01); *H04W 4/90* (2018.02); *H04W 8/183* (2013.01); *H04W 8/186* (2013.01); *H04W 8/22* (2013.01)

(58) Field of Classification Search
CPC .............................. H04L 51/222; G06Q 50/01
USPC ...... 206/210, 366; 383/33; 455/404.1, 456.3
See application file for complete search history.

(56) References Cited

U.S. PATENT DOCUMENTS

| | | |
|---|---|---|
| 5,666,010 A | 9/1997 | Stratiotis |
| 5,796,341 A | 8/1998 | Stratiotis |
| | (Continued) | |

*Primary Examiner* — Kiet M Doan
(74) *Attorney, Agent, or Firm* — Gary W. Grube

(57) ABSTRACT

A method includes identifying a first user device potentially associated with a biohazard and identifying a geographic area associated with the biohazard based on previous location information of the first user device. The method further includes identifying a another user device potentially associated with the biohazard based on the geographic area associated with the biohazard and previous location information of the other user device. The method further includes issuing a safety notification to the other user device, where the safety notification includes one or more of the geographic area associated with the biohazard, a safety status request, a safety status level of the first user device, a subset of the previous location information of the first user device, and a subset of the previous location information of the other user device.

12 Claims, 7 Drawing Sheets

Related U.S. Application Data continuation of application No. 16/892,701, filed on Jun. 4, 2020, now Pat. No. 11,146,914, which is a continuation of application No. 16/209,511, filed on Dec. 4, 2018, now Pat. No. 10,812,931, which is a continuation of application No. 15/831,270, filed on Dec. 4, 2017, now Pat. No. 10,154,373, which is a continuation of application No. 15/406,387, filed on Jan. 13, 2017, now Pat. No. 10,462,601, which is a continuation of application No. 15/145,764, filed on May 3, 2016, now Pat. No. 9,549,305, which is a continuation of application No. 13/566,824, filed on Aug. 3, 2012, now Pat. No. 9,363,097.

(60) Provisional application No. 61/521,506, filed on Aug. 9, 2011.

(51) Int. Cl.
*H04L 12/18* (2006.01)
*H04W 4/02* (2018.01)
*H04W 8/18* (2009.01)

(56) References Cited

U.S. PATENT DOCUMENTS

| | | |
|---|---|---|
| 7,835,721 B2 | 11/2010 | Tuulos |
| 7,867,754 B1 | 1/2011 | Regnier |
| 8,442,969 B2 | 5/2013 | Gross |
| 8,644,506 B2 | 2/2014 | Zellner |
| 8,688,146 B2 | 4/2014 | Grube |
| 2003/0162557 A1 | 8/2003 | Shida |
| 2004/0002843 A1 | 1/2004 | Robarts |
| 2004/0020264 A1 | 2/2004 | Megerle |
| 2007/0133479 A1 | 6/2007 | Montojo |
| 2007/0292844 A1* | 12/2007 | Tilles ................. G01N 35/1095 435/7.1 |
| 2008/0096529 A1 | 4/2008 | Zellner |
| 2008/0101654 A1 | 5/2008 | Sano |
| 2009/0037547 A1 | 2/2009 | Endo |
| 2009/0049038 A1 | 2/2009 | Gross |
| 2009/0181640 A1 | 7/2009 | Jones |
| 2011/0134787 A1 | 6/2011 | Hirano |
| 2012/0154117 A1 | 6/2012 | Nice et al. |
| 2012/0190362 A1 | 7/2012 | Subbarayudu |

* cited by examiner

PROVIDING STATUS OF USER DEVICES ASSOCIATED WITH A BIOHAZARD

CROSS REFERENCE TO RELATED PATENTS

The present U.S. Utility Patent Application claims priority pursuant to 35 U.S.C. § 120 as a continuation of U.S. Utility application Ser. No. 17/493,997, entitled "PROVIDING STATUS OF USER DEVICES ASSOCIATED WITH A BIOHAZARD," filed Oct. 5, 2021, allowed, which is a continuation of U.S. Utility application Ser. No. 16/892,701, entitled "PROVIDING STATUS OF USER DEVICES ASSOCIATED WITH A BIOHAZARD," filed Jun. 4, 2020, issued as U.S. Pat. No. 11,146,914 on Oct. 12, 2021, which is a continuation of U.S. Utility application Ser. No. 16/209,511, entitled "PROVIDING EVACUATION INFORMATION DURING AN ADVERSE CONDITION," filed Dec. 4, 2018, issued as U.S. Pat. No. 10,812,931 on Oct. 20, 2020, which is a continuation of U.S. Utility application Ser. No. 15/831,270, entitled "PROVIDING STATUS OF USER DEVICES DURING AN ADVERSE CONDITION," filed Dec. 4, 2017, issued as U.S. Pat. No. 10,154,373 on Dec. 11, 2018, which is a continuation of U.S. Utility application Ser. No. 15/406,387, entitled "PROVIDING STATUS OF USER DEVICES DURING AN ADVERSE CONDITION," filed Jan. 13, 2017, issued as U.S. Pat. No. 10,462,601 on Oct. 29, 2019, which is a continuation of U.S. Utility application Ser. No. 15/145,764, entitled "PROVIDING STATUS OF USER DEVICES DURING AN ADVERSE EVENT," filed May 3, 2016, issued as U.S. Pat. No. 9,549,305 on Jan. 17, 2017, which is a continuation of U.S. Utility application Ser. No. 13/566,824, entitled "ACQUIRING SAFETY STATUS INFORMATION," filed Aug. 3, 2012, issued as U.S. Pat. No. 9,363,097 on Jun. 7, 2016, which claims priority pursuant to 35 U.S.C. § 119(e) to U.S. Provisional Application No. 61/521,506, entitled "EMERGENCY PREPAREDNESS STATUS PROCESSING", filed Aug. 9, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to emergency preparedness information processing within such computing systems.

DESCRIPTION OF RELATED ART

Emergencies are known to be associated with direct costs (e.g., rebuilding), indirect costs (e.g., higher insurance premiums,) and serious loss of life. Such emergencies include man-made emergencies and natural disasters. Examples of man-made emergencies are known to include traffic accidents, structure fires, chemical spills, railroad accidents, aircraft accidents, shipping accidents, criminal activities, and terrorism. Examples of natural disasters are known to include hurricanes, typhoons, earthquakes, forest fires, mudslides, floods, droughts, dust storms, hail storms, extreme heat, extreme cold, and snow storms.

Emergency management is known to address reducing the impact of emergencies by avoiding risks associated with emergencies and by utilizing more effective practices and tools to respond to emergencies. Emergency management is known to partition such management into phases including a mitigation phase (e.g., to reduce risks, to reduce the effects of disasters), a preparedness phase (e.g., planning, resourcing, drilling), a response phase (e.g., primary resource activation, secondary resource activation), and a recovery phase (e.g., rebuilding).

Emergency impact may be abated by improving the effectiveness of the preparedness phase. For example, preparing a resource checklist that is relevant to a group of individuals and a particular emergency scenario may improve the effectiveness of a subsequent response phase. In another example, providing a training tutorial that is relevant to the group of individuals and the particular emergency scenario may also improve the effectiveness of the subsequent response phase. In another example, providing a training drill that is relevant to the group of individuals and the particular emergency scenario that utilizes resources from the resource checklist and process steps from the training tutorial may also improve the effectiveness of the subsequent response phase.

Emergency impact may be abated by improving the effectiveness of the response phase. For example, effective communications between individuals and groups of individuals affected by (e.g., victims, including individuals, families, co-workers, etc.) or responding to an emergency (e.g., first responders, second responders, aid workers, volunteers, individuals) may improve the effectiveness of the response phase. In an instance, a first family member communicates with a second family member via a cellular telephone with instructions including where to go for help. In another instance, a second responder communicates with a volunteer indicating needed resources at the scene of an emergency.

Computing systems are known to process data into information, store information and communicate information. Such information may include emergency preparedness information and response phase communications information. Individuals utilize computing systems to gain access to such emergency preparedness information. Despite such access, individuals may not always obtain desired or optimal emergency preparedness information due to complexities associated with a relevant emergency scenario, resource gaps, chain of command, lack of training, and tension associated with emergency. Individuals utilize public computing systems (e.g., the internet, wireless devices, wireless networks) to communicate response phase communications information during an emergency. Despite such utilization, public computing systems (e.g., a commercial wireless carrier network) typically can't sustain a demanded traffic volume of such response phase communications information when the demanded traffic volume is multiples of a typical non-emergency time period. In an instance, a cellular network may provide tens of voice call communications paths per cellular tower when hundreds of voice call resources are in demand. One solution is to utilize text messaging rather than voice telephony to carry out communication of the response phase communications information. For example, hundreds of individuals can communicate via text messaging utilizing a similar cellular network channel resource that can only support a single voice call. Despite such texting capability, effective utilization of texting services is impacted by one more of identifying other users to communicate with, entering identifiers associated with the other users, and rapidly exchanging the response phase communications information.

BRIEF DESCRIPTION OF THE SEVERAL
VIEWS OF THE DRAWING(S)

DETAILED DESCRIPTION OF THE
INVENTION

Figure 1:
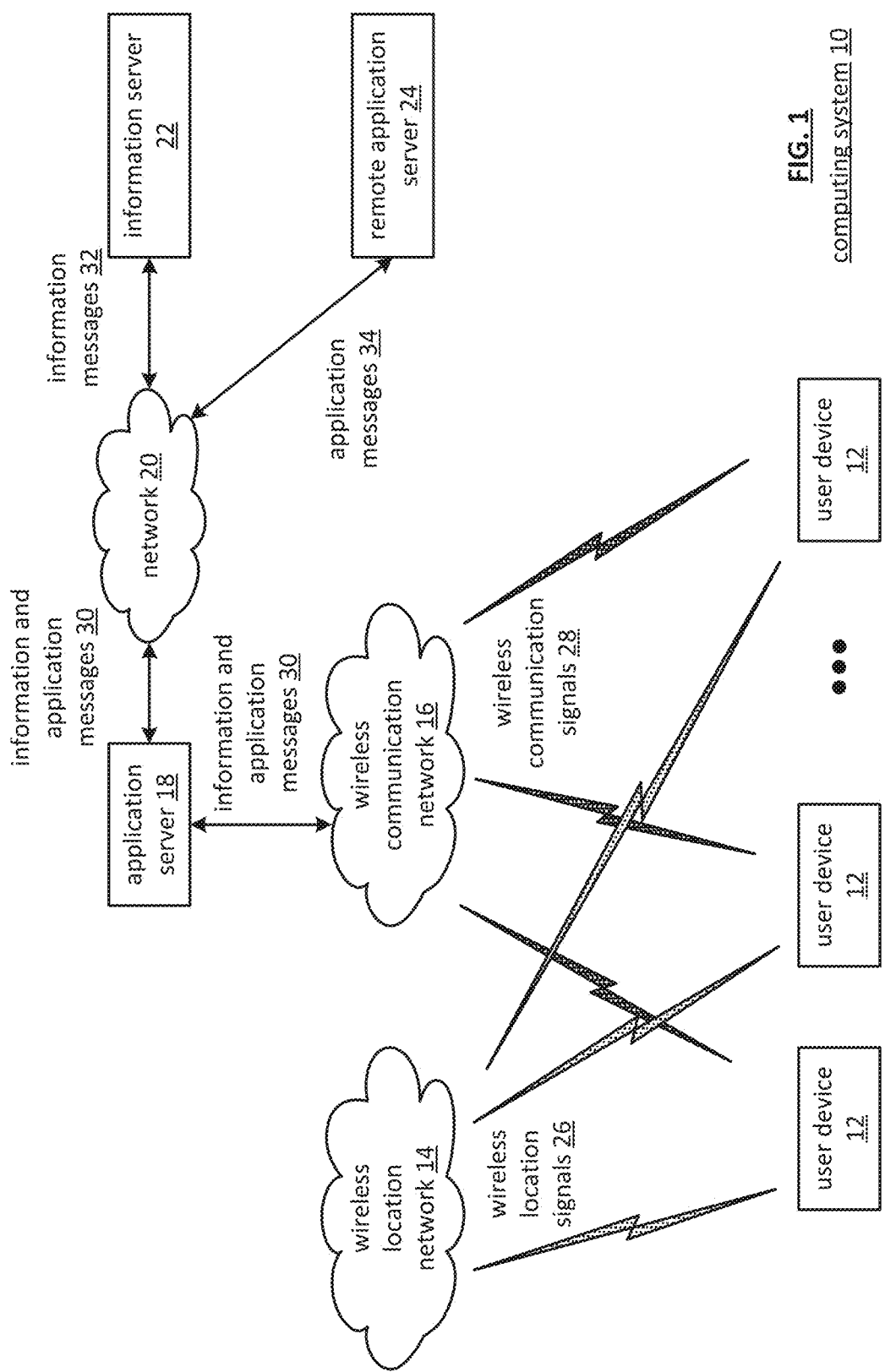
FIG. 1 is a schematic block diagram of an embodiment of a computing system in accordance with the present invention.

FIG. 1 is a schematic block diagram of an embodiment of a computing system 10 that includes a plurality of user devices 12, a wireless location network 14, a wireless communication network 16, an application server 18, a network 20, an information server 22, and a remote application server 24. The wireless location network 14 includes one or more of a public wireless location system (e.g., global positioning satellite (GPS), a cellular network) and one or more private wireless location systems (e.g., wireless beacon, a wireless local area network (WLAN)). The wireless location network 14 sends wireless location signals 26 to the plurality of user devices 12 to enable determination of location information.

The wireless communications network 16 includes one or more of a public wireless communications system and a private wireless communications system and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. The wireless communication network 16 sends wireless communications signals 28 to the plurality of user devices 12 and receives wireless communications signals 28 from the plurality of user devices 12 to communicate information and application messages 30. Alternatively, or in addition to, the plurality of user devices 12 may send and receive the wireless communications signals 28 directly between two or more user devices 12 of the plurality of user devices 12.

The application server 18 includes a processing module and memory to support execution of one or more applications (e.g., an emergency preparedness application). The processing module may be a single processing device or a plurality of processing devices. Such a processing device may be implemented with one or more of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. The memory device may be a read-only memory, random access memory, volatile memory, non-volatile memory, static memory, dynamic memory, flash memory, cache memory, and/or any device that stores digital information. The processing devices may be centrally located (e.g., directly coupled together via a wired and/or wireless bus structure) when the processing module includes more than one processing device, or may be distributedly located (e.g., cloud computing via indirect coupling via a local area network and/or a wide area network). The memory and/or memory element storing the corresponding operational instructions may be embedded within, or external to, the circuitry comprising the state machine, analog circuitry, digital circuitry, and/or logic circuitry when the processing module implements one or more of its functions via a state machine, analog circuitry, digital circuitry, and/or logic circuitry. The memory element stores hardcoded and/or operational instructions and the processing module executes the hardcoded and/or operational instructions corresponding to at least some of the steps and/or functions illustrated in FIGS. 1-7.

The network 20 may include one or more of wireless and/or wireline communications systems, one or more private communications systems, and a public internet system. The application server 18 communicates information and application messages 30 via the wireless communication network 16 to the plurality of user devices 12 and via the network 20 to the information server 22 and the remote application server 24. The information server 22 includes a processing module and memory to support storage and retrieval of information (e.g., emergency preparedness information) via information messages 32. For example, the information server 22 streams emergency preparedness information via the network 20 and the wireless communication network 16 to one or more of the user devices 12. As another example, information server 22 sends emergency preparedness information to user device 12 in response to receiving a request for emergency preparedness information from the user device 12. The remote application server 24 includes a processing module and memory to support execution of one or more applications (e.g., the emergency preparedness application). For example, the remote application server 24 sends an application output response message as an application message 34 to the user device 12 in response to receiving an application request as the application message 34 from the user device 12.

The plurality of user devices 12 may be a portable computing device (e.g., a smart phone, a tablet computer, a laptop a handheld computer and/or any other portable device that includes a computing unit) and/or a fixed computing device (e.g., a desktop computer, a cable television set-top box, an application server, an internet television user interface and/or any other fixed device that includes a computing unit). Such a portable or fixed computing device includes one or more of a computing unit (e.g., providing processing module functionality), one or more wireless modems, sensors, and one or more user interfaces. An embodiment of the user device 12 will be described in greater detail with reference to FIG. 2.

In general and with respect to emergency preparedness, the system 10 supports three primary functions: emergency preparedness planning, emergency preparedness drilling, and response phase emergency communications. In accordance with these three primary functions, emergency preparedness plans can be created that are relevant in relationship to likely emergency scenarios and those affected, the emergency preparedness plans can be exercised by way of drilling and training to enable more efficient operations during an emergency response phase, and communications can be provided during an emergency response that is efficient in terms of mitigation resource utilization and relevant in terms of scope and nature of an associated emergency scenario.

The first primary function includes the user device determining emergency preparedness planning information. In an example of operation, the user device 12 determines location information based on receiving the wireless location signals 26. Next, the user device 12 sends a checklist request message that includes the location information to the application server 18 as wireless communications signals 28 via the wireless communications network 16. The application server 18 determines recommended checklists based on the location information to produce recommended checklists (e.g., a hurricane checklist, a tornado checklist, etc.). For instance, the application server 18 determines the recommended checklists to include the hurricane checklist and the tornado checklist when the location information indicates that the user device is located in central Florida. As another instance, the application server 18 determines the recommended checklists to include an earthquake checklist and a wildfire checklist when the location information indicates that the user device is located in Southern California. The application server 18 sends the recommended checklists to the user device 12. The user device 12 displays the recommended checklists and receives user input to produce a selected checklist. The user device 12 sends the selected checklist to the application server 18. The application server 18 determines selected checklist information based on the selected checklist. The application server 18 sends the selected checklist information to the user device 12. The user device 12 displays the selected checklist information and receives user input. The user device 12 modifies checklist item availability status to produce modified checklist item availability status. The user device 12 stores the modified checklist item availability status and may send the modified checklist item availability status to the application server 18 and/or the information server 22. In addition, the user device 12 may produce a checklist item reminder (e.g., a visual and audible alert) in accordance with a checklist alert schedule when the modified checklist item availability status compares unfavorably to a checklist item availability template. The method of operation to determine emergency preparedness planning information is discussed in greater detail with reference to FIGS. 3-7.

The second primary function includes the user device 12 participating in emergency preparedness drilling. In an example of operation, the user device 12 obtains location information and other context information (e.g., including a drill schedule) to produce a context bundle. The user device 12 sends a drill request message to the remote application server 24 that includes the context bundle. The remote application server 24 determines drill parameters (e.g., a drill scenario) and a drill identifier (ID) based on the drill request message. For instance, the remote application server 24 determines the drill scenario to be a hurricane drill based on the location information indicating that the user device 12 is near the Atlantic Ocean. As another instance, the remote application server 24 determines the drill scenario to be an earthquake drill based on the location information indicating that the user device 12 is near an earthquake fault line. The remote application server 24 sends the drill parameters and the drill ID to the user device 12. The remote application server 24 initializes a drill application associated with the drill ID and in accordance with the drill parameters. The remote application server 24 sends a drill update message to the user device 12 that includes drill application output associated with the drill application. The user device 12 receives the drill update message and sends the drill application output to a display associated with the user device. The user device 12 receives user input to produce drill input information. The user device 12 sends a drill input message to the remote application server 24 that includes the drill input information. The remote application server 24 receives the drill input message and provides the drill application with the drill input information to produce updated drill application output. The remote application server 24 sends a second drill update message to the user device 12 that includes the updated drill application output. The process repeats until the application reaches an end point. The method of operation to participate in drilling is discussed in greater detail with reference to FIGS. 3-7.

The third primary function includes the user device 12 communicating during an emergency response phase. In an example of operation, the user device 12 obtains location information and other context information (e.g., including a group ID affiliation) to produce the context bundle. The user device 12 obtains local status (e.g., ok, getting help, need help, etc.) via a user prompt. Next, the user device 12 sends a status request message to the application server 18 that includes the local status and the context bundle. The application server 18 receives the status request message and determines a status associated with each user device 12 affiliated with the group ID. For instance, the application server 18 sends a status request message to the other user devices 12 affiliated with the group ID and receives status response messages indicating status. The application server 18 sends a status response message that includes status information of the other user devices 12 affiliated with the group ID to the user device. The user device 12 receives the status response message and displays the status information in accordance with the context bundle. For instance, the user device 12 displays names associated with the other user devices 12 and utilizes a colored icon to indicate status of the other user device (e.g., red for not okay, green for okay). As another instance, the user device 12 displays names associated with the other user devices in a rank ordered list where the ranking is by relative distance away from the user device 12 as determined utilizing status information associated with the other user devices 12. As another instance, the user device 12 displays the names associated with the other user devices 12 on a map where in the center of the map is a location associated with the user device 12. The method of operation to communicate is discussed in greater detail with reference to FIGS. 3-7.

Figure 2:
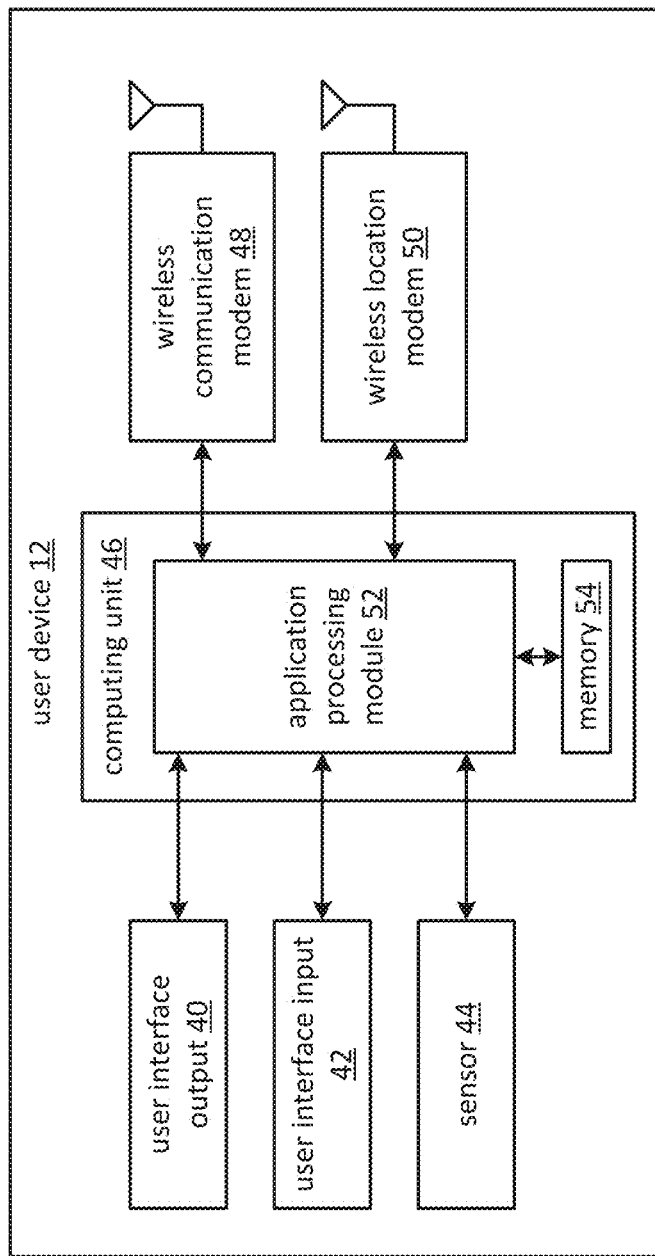
FIG. 2 is a schematic block diagram of an embodiment of a user device in accordance with the present invention.

FIG. 2 is a schematic block diagram of an embodiment of a user device 12 that includes a user interface output 40, a user interface input 42, a sensor 44, a computing unit 46, a wireless communications modem 48, and a wireless location modem 50. The user interface output 40 may be a single interface output device or a plurality of interface output devices. The user interface output 40 may include one or more of a display, a touch screen, a speaker, an earpiece, a motor, an indicator light, a transducer, and a digital indicator. For instance, the user interface output 40 includes a color touch screen display capable of rendering static images and/or full-motion video. The user interface input 42 may be a single interface input device or a plurality of interface input devices. The interface input device includes one or more of a touch screen sensor array, a keyboard, a microphone, a fingerprint reader, a trackball, a mouse sensor, a pushbutton, and a selector switch. For instance, the interface input device includes a touch screen sensor array associated with the color touch screen display. The sensor 44 may be a single sensor device or a plurality of sensor devices. The sensor device includes capabilities for sensing one or more of a magnetic field (e.g., a compass), motion, temperature, pressure, altitude, humidity, an image, a stream of images (e.g., capture video), biometrics, proximity, capacitance, gases, radiation, pathogens, light levels, and bio hazards.

The wireless communications modem 48 may include a single wireless transceiver or a plurality of wireless transceivers. The wireless transceiver may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. The wireless location modem 50 may include one or more of a single wireless location receiver, a single wireless location transceiver, a plurality of wireless location receivers, and a plurality of wireless location transceivers. The wireless location transceiver and wireless location transceiver may operate in accordance with one or more wireless location technologies including GPS, WiFi, angle of arrival, time difference of arrival, signal strength, and beaconing.

The computing unit 46 includes an application processing module 52, a memory 54 one or more interfaces to one or more of the user interface output 40, user interface input 42, the sensor 44, the wireless communication modem 48, and the wireless location modem 50. The memory 54 may include a single memory device or a plurality of memory devices. The memory device may be a read-only memory, random access memory, volatile memory, non-volatile memory, cache memory, and/or any device that stores digital information. Memory device examples include static random access memory (SRAM), dynamic random access memory (DRAM), NAND flash memory, magnetic memory (e.g., a hard disk), and optical memory (e.g., an optical disc).

The application processing module 52 may be a single processing device or a plurality of processing devices. The processing device may include one or more of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The application processing module 52 may have an associated memory and/or memory element, which may be a single memory device, a plurality of memory devices, and/or embedded circuitry of the application processing module.

The memory 54 include one or more of a read-only memory, random access memory, volatile memory, non-volatile memory, static memory, dynamic memory, flash memory, cache memory, and/or any device that stores digital information. The processing devices may be centrally located (e.g., directly coupled together via a wired and/or wireless bus structure) when the application processing module includes more than one processing device, or the processing devices may be distributedly located (e.g., cloud computing via indirect coupling via a local area network and/or a wide area network). The memory and/or memory element storing the corresponding operational instructions may be embedded within, or external to, the circuitry comprising the state machine, analog circuitry, digital circuitry, and/or logic circuitry) when the application processing module implements one or more of its functions via a state machine, analog circuitry, digital circuitry, and/or logic circuitry. The memory element stores hard coded and/or operational instructions and the application processing module executes the hard coded and/or operational instructions corresponding to at least some of the steps and/or functions illustrated in FIGS. 3-7.

Figure 3:
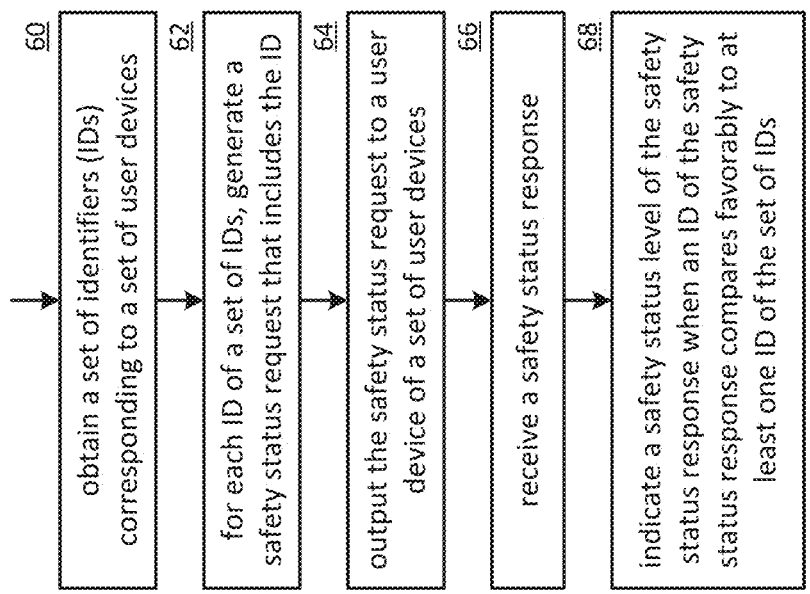
FIG. 3 is a flowchart illustrating an example of acquiring safety status information associated with a set of user devices in accordance with the present invention.

FIG. 3 is a flowchart illustrating an example of acquiring safety status information associated with a set of user devices. The method begins at step 60 where a processing module (e.g., of a requesting entity) obtains a set of identifiers (IDs) corresponding to a set of user devices. Each user device of the set of user devices is associated with a corresponding safety status level. The set of identifiers includes at least one of at least one mobile phone number corresponding to at least one user device, at least one user device serial number corresponding to the at least one user device, at least one user device media access control (MAC) address corresponding to the at least one user device, at least one user internet protocol (IP) address corresponding to the at least one user device, at least one user device international mobile equipment identities (IMEI) corresponding to the at least one user device, at least one variable ID corresponding to the at least one user device, at least one assignable ID corresponding to the at least one user device, at least one social network contact name corresponding to the least one user device, and at least one user name corresponding to the at least one user device.

The safety status level includes at least one of a safety status level text string generated by a user device (e.g., safe/not safe), a safety status text string generated by the one user device (e.g., I'm at the mall, send help), location information generated by the one user device (e.g., global positioning satellite (GPS) coordinates, an address, a location description), a timestamp corresponding to when the social network server received the safety status response, a timestamp corresponding to when the one user device generated the safety status response, and a timestamp corresponding to when the safety status response was received.

The obtaining the set of IDs corresponding to the set of user devices includes at least one of a variety of approaches. In a first approach, the processing module retrieves the set of IDs from a list. In a second approach, the processing module outputs a query and receives a response. In a third approach, the processing module accesses a group affiliation. A group affiliation includes a commonality factor amongst a group of users of a group of user devices. The commonality factor includes one or more of a common neighborhood, common family members, common friends, common coworkers, common classmates, common club members, common social networking friends, common interests, common questions, and common web browser history.

In a fourth approach of obtaining the set of IDs, the processing module obtains the set of IDs from social networking information associated with at least one user device of the set of user devices. The social networking information includes one or more of a live social networking stream, content of one or more social networking postings, social networking registration information, social networking substructure information, purchases associated with social networking, purchasers associated with social networking, a friend identifier, a friend of a friend identifier, and a new friend entry. For example, the processing module obtains one or more IDs of the set of IDs from a live social networking stream (e.g., Twitter). As another example, the processing module obtains one or more IDs of the set of IDs from a social networking subscriber list (e.g., a Facebook friend list).

In a fifth approach of obtaining the set of IDs, the processing module receives the set of IDs (e.g., from another associated user device, from a social network and server). In a sixth approach, the processing module obtains a user selection of the set of IDs. The obtaining the user selection of the set of IDs includes a sequence of steps. In a first step, the processing module indicates a group of usernames corresponding to a group of user devices. In a second step, the processing module obtains a set of username selections from the group of usernames. In a third step, for each username, the processing module obtains an ID associated with the username when the username is associated with a mobile phone number and updates the set of IDs to include the ID. For example, the processing module receives the user selection from a user interface input.

As an example of obtaining the set of IDs, the processing module displays a prompt, wherein the prompt includes a portion of a contact list, and receives a selection of "Sally" via a user device input corresponding to a contact of the contact list. As another example, the processing module obtains a contact "Bob" when a location indicator indicates that a user device associated with Bob is within a proximal range of the requesting entity. As yet another example, the processing module obtains a contact "George" when a timestamp indicates 6 pm and a selection schedule lookup indicates that the contact George is to be obtained after 6 PM on a daily basis. As a further example, the processing module obtains a contact "Christopher" when a location indicator associated with the processing module indicates that a user device associated with the processing module is within a proximal distance to a high crime area and a table lookup indicates to add Christopher whenever the user device is within a proximal distance to a high crime area.

For each identifier (ID) of the set of IDs, the method continues at step 62 where the processing module generates a safety status request that includes the ID. The generating the safety status request includes generating at least one of an instant message, a short message service (SMS) message, an email message, and a data message. When generating the at least one of the instant message, the SMS message, the email message, and the data message, the processing module generates the at least one of the instant message, the SMS message, the email message, and the data message to include at least one of the ID, a mobile phone number corresponding to the ID, the set of IDs, a requesting entity ID, a social networking posting request (e.g., a most recent posting, a set of postings, a posting pertaining to a search term and/or cloud tag), a safety status request code, and a safety status request text string (e.g., "please respond to this message with your current status"). For example, the processing module generates a safety status request to include ID 312-555-1234 of the set of IDs, requesting entity ID 312-555-4321, and a status request code text string of "please respond to this message with your current status."

The method continues at step 64 where the processing module outputs the safety status request to a user device of the set of user devices that corresponds to the ID. The outputting the safety status request to the user device includes the processing module facilitating at least one of a variety of approaches. In a first approach, the processing module facilitates transmitting the safety status request on a control channel of a wireless communication network (e.g., as a wireless communication signal). In a second approach, the processing module facilitates transmitting the safety status request on a data channel of the wireless communication network (e.g., as the wireless communication signal). In a third approach, the processing module facilitates transmitting the safety status request directly to the user device utilizing the wireless communication signals. In a fourth approach, the processing module facilitates sending the safety status request to the user device via at least one of the wireless communication network and a wireline communication network (e.g., internet, telephony network, fiber, cable, twisted-pair, local area network, wide area network. In a fifth approach, the processing module facilitates sending the safety status request to an application server via at least one of the wireless communication network and the wireline communication network. In a six approach, the processing module facilitates sending the safety status request to a social network server.

The method continues at step 66 where the processing module receives a safety status response of a set of safety status responses. The safety status response includes a corresponding safety status level of one user device of the set of user devices. The receiving the safety status response includes a processing module facilitating at least one of a variety of approaches. In a first approach, the processing module facilitates receiving the safety status response on the control channel of the wireless communication network. In a second approach, the processing module facilitates receiving the safety status response on the data channel of the wireless communication network. In a third approach, the processing module facilitates receiving the safety status response from the social network server. In a fourth approach, the processing module facilitates receiving the safety status response from the one user device via at least one of the wireless communication network and the wireline communication network. In a fifth approach, the processing module facilitates receiving the safety status response from the application server via at least one of the wireless communication network and the wireline communication network.

The method continues at step 68 where the processing module indicates the safety status level of the safety status response when an ID of the safety status response compares favorably to at least one ID of the set of IDs. For example, the processing module determines that a contact selection is associated with a mobile ID when the processing module accesses a contact list entry corresponding to the contact selection of "Sally" and accesses the mobile ID field that includes a mobile phone number corresponding to Sally. The indicating the safety status level of the safety status response includes at least one of a variety of approaches. In the first approach, the processing module identifies the safety status level of the safety status response when the ID of the safety status response compares favorably to the at least one ID of the set of IDs. In a second approach, the processing module interprets the safety status level text string to produce a safety status condition (e.g., safe/not safe). In a third approach, the processing module selects an indicator icon based at least one of the safety status level and the safety status condition (e.g., a red X corresponding to a not safe safety status condition, a green dot corresponding to a safe safety status condition).

In a fourth approach of indicating the safety status level of the safety status response, the processing module facilitates displaying of one or more of the safety status level, the safety status condition, the indicator icon, the safety status level text string, the location information, and the timestamp (e.g., displaying includes visual and/or audible, along with other social network info). For example, the processing module displays a username of "John" that corresponds to the user device of ID 312-555-1234, a text message of "safe, at home", location information of an address of 111 W. Main St, Home Town, Calif., and a timestamp of 2011-07-30 19:36:22 GMT+0. As another example, the processing module displays a username of "Michelle" that corresponds to a user device of ID 312-555-1222, a text message of "not safe, in storm path, need a pick up at school", location information of an address of 326 W. First St, Home Town, Calif., and a timestamp of 2011-07-30 19:37:52 GMT+0.

Figure 4:
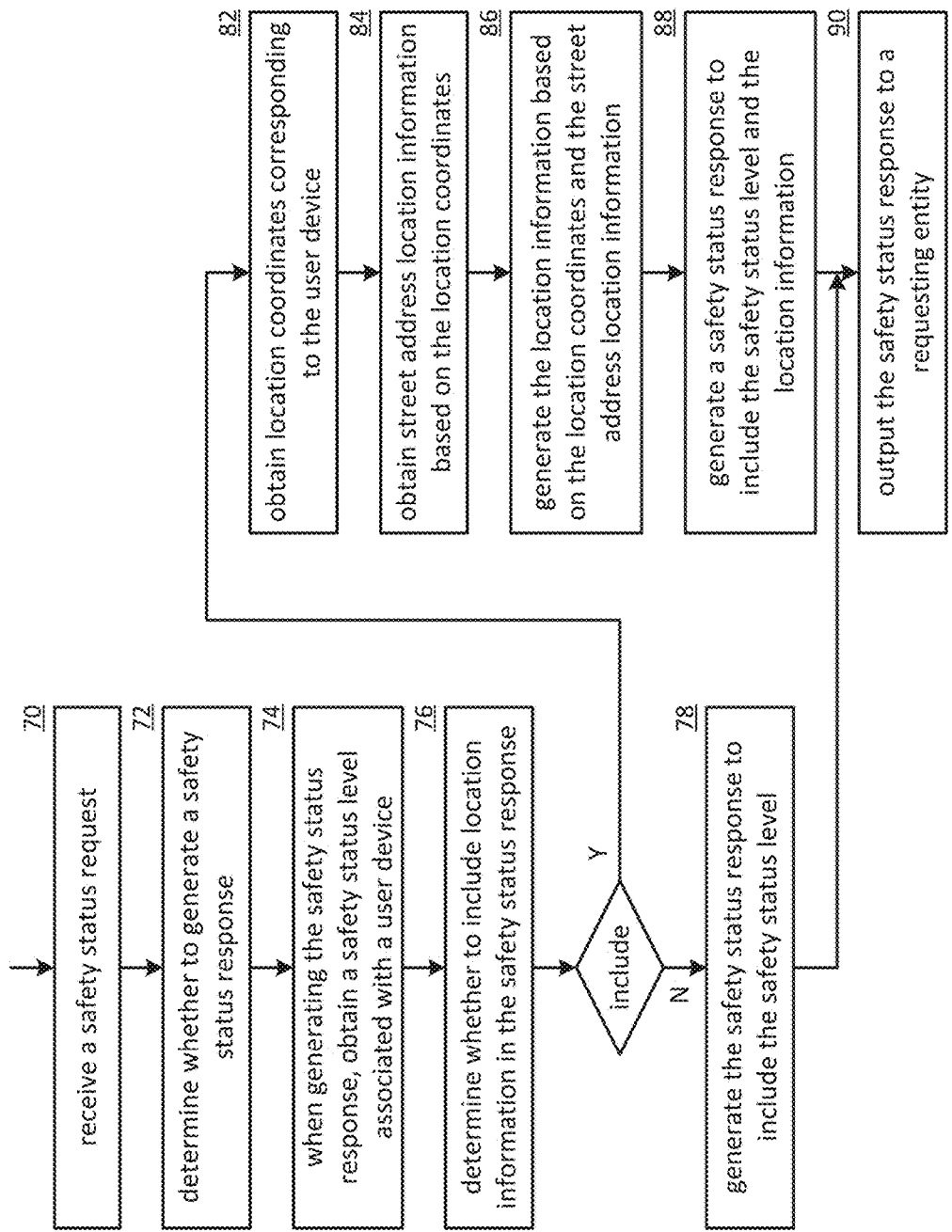
FIG. 4 is a flowchart illustrating an example of providing safety status information in accordance with the present invention.

FIG. 4 is a flowchart illustrating an example of providing safety status information. The method begins at step 70 where a processing module (e.g., of a responding user device, of an application server, of a social network server) receives a safety status request for a safety status level associated with a user device. The safety status level includes at least one of a safety status level text string generated by the user device, a safety status text string generated by the user device, a safety status text string generated by the social network server (e.g., interpreting one or more postings), location information associated with the user device, a timestamp corresponding to generation of the safety status response, and a timestamp estimate corresponding to when the safety status response is expected to be received (e.g., received by a requesting entity, received by the social network server).

The method continues at step 72 where the processing module determines whether to generate a safety status response. The determining whether to generate the safety status response includes a sequence of steps. In a first step, the processing module identifies allowable requesting entities based on at least one of a social network contact list, social network sub-contact list (e.g., friends list), a group affiliation, a social network information stream (e.g., Twitter feed, Facebook message), accessing an auto-respond to all requesters indicator, accessing an allowable requesting entity list, accessing a set of identifiers (IDs) corresponding to a set of user devices associated with the user device, and receiving a user input. In a second step to generate the safety status response, the processing module determines to generate the safety status response when a requesting entity identifier of the safety status request compares favorably to the identified allowable requesting entities (e.g., auto-respond to all requesters indicator indicates to enable auto-respond to all requesters, the requesting entity ID is substantially the same as an ID of one of the identified allowable requesting entities).

When generating a safety status response, the method continues at step 74 where the processing module obtains the safety status level associated with the user device. The obtaining the safety status level associated with the user device includes at least one of a variety of approaches. A first approach includes querying social network server. A second approach includes accessing a predetermined safety status level (e.g., pre-stored by a user of the user device). A third approach includes querying the user device. A fourth approach includes receiving the safety status level from the user device. A fifth approach includes receiving a safe/not-safe indicator. A sixth approach includes receiving a safety status text string associated with the safety status level. A seventh approach includes generating the safety status text string based on the location schedule (e.g., scheduled to be at school, a schedule adherence deviation indicator). An eighth approach includes interpreting a schedule adherence deviation indicator (e.g., string indicates Johnny is not at school when a calendar indicates that Johnny should be at school and a current location indicates that Johnny is not at school). A ninth approach includes obtaining a user input. A 10th approach includes obtaining accelerometer information associated with the user device (e.g., speed, acceleration, movement versus time, speed exceeds a posted speed limit). An 11th approach includes obtaining a picture associated with the user device (e.g., from current location, always or only when not safe).

A 12th approach to obtain the safety status level associated with the user device includes receiving at least one of a radio frequency identifier (RFID), a near field communication (NFC) signal, and a barcode scanner value. A 13th approach includes obtaining a timestamp. A 14th approach includes obtaining geographic location alert information with regards to a comparison of a real-time geographic location to a predetermined geographic location (e.g., geo-fence). A 15th approach includes generating a safety status level text string to include a not-safe indication when the comparison of the real-time geographic location to the predetermined geographic location is unfavorable (e.g., outside of the geo-fence). A 16th approach includes generating the safety status level text string to include the not-safe indication when a comparison of the real-time geographic location to a geographic location associated with the safety status text string is unfavorable (e.g., schedule is to be at school but real-time location is not at school).

As an example of obtaining the safety status level, the processing module retrieves the predetermined safety status level indicating a text string of "safe, at home." As another example, the processing module receives a user input text string of "not safe, can't start my car at the mall." As yet another example, the processing module retrieves a user device camera sensor picture file when a current location indicator indicates an unfavorable location (e.g., a variation from adherence to a schedule, outside of a geo-fence, within a known area of concern, within a forecasted storm path). Alternatively, or in addition to, the processing module may display the user device safety status level via a user interface output.

The method continues at step 76 where the processing module determines whether to include location information in the safety status response. The determining whether to include the location information in the safety status response includes at least one of a variety of alternatives. A first alternative includes receiving a user input. A second alternative includes querying a social network server. A third alternative includes receiving a request for location information from a member of a social network group, wherein the user device is affiliated with the social network group. A fourth alternative includes interpreting a schedule adherence deviation indicator (e.g., include location information when the deviation indicator indicates a deviation). A fifth alternative includes obtaining a user preference with regards to including the location information in the safety status response (e.g., privacy setting). A sixth alternative includes indicating to include location information in the safety status response when the safety status request includes an indicator to always include the location information in the safety status response. The method branches to step 82 when the processing module determines to include the location information in the safety status response. The method continues to step 78 when the processing module determines not to include location information in the safety status response. When not including the location information, the method continues at step 78 where the processing module generates the safety status response to include the safety status level. The method branches to step 90.

When including the location information, the method continues at step 82 where the processing module obtains location coordinates corresponding to the user device. The location coordinates includes at least one of a longitude value, a latitude value, an elevation value, a speed value, an acceleration value, and a location quality indicator. The obtaining location coordinates corresponding to the user device includes at least one of a variety of approaches. A first approach includes receiving the location coordinates from at least one location sensor associated with the user device (e.g., accelerometer, electronic compass, global positioning system (GPS) receiver). A second approach includes receiving the location coordinates from a wireless location modem associated with the user device (e.g., time of arrival receiver, cell site, time difference of arrival, signal strength, angle of arrival, GPS receiver, WiFi site ID, etc.). A third approach includes querying the user device to obtain the location coordinates (e.g., from a server). A fourth approach includes querying an internet protocol (IP) address to location coordinates table based on an identified IP address (e.g., IP address associated with user device). A fifth approach includes querying a social network server to obtain the location coordinates. A sixth approach includes accessing last known location coordinates when a location quality level associated with the location coordinates compares unfavorably to a location quality level threshold (e.g., location coordinates unobtainable, location coordinates too old, location coordinates not accurate enough, indoor location unknown).

The method continues at step 84 where the processing module obtains street address location information based on the location coordinates. The obtaining the street address location information includes at least one of a variety of alternatives. A first alternative includes accessing a location coordinates to street address location table based on the location coordinates to produce the street address location information. A second alternative includes querying a location server based on the location coordinates. A third alternative includes querying another user device associated with a social network group, wherein the social network group includes the user device. A fourth alternative includes accessing an internet protocol (IP) address to street address location table utilizing an identified IP address (e.g., an IP address associated with user device). A fifth alternative includes accessing a wireless communication network access device identifier (ID) to street address location table utilizing an identified wireless communication network access device ID. A sixth alternative includes receiving the street address location information from the location server. A seventh alternative includes accessing a last known street address location when a location quality level associated with the location coordinates compares unfavorably to a location quality level threshold.

The method continues at step 86 where the processing module generates the location information based on the location coordinates and the street address location information. For example, the processing module generates the location information to include the location coordinates and the street address location information. As another example, the processing module generates a web link to a location server that includes the location coordinates and includes a web link in the location information. The web link may be subsequently utilized by a requesting entity to retrieve a geographic map representing a location of the user device.

The method continues at step 88 where the processing module generates the safety status response to include the safety status level and the location information. The generating the safety status response includes generating at least one of an instant message, a short message service (SMS) message, an email message, and a data message. When generating the at least one of the instant message, the SMS message, the email message, and the data message, the processing module generates the at least one of the instant message, the SMS message, the email message, and the data message to include at least one of a mobile phone number corresponding to the user device, an identifier associated with the user device, a social networking posting associated with the user device, a requesting entity ID associated with the requesting entity, the safety status level, a timestamp corresponding to transmission of the safety status response, the location information, and a safety status response code.

A method continues at step 90 where the processing module outputs the safety status response to the requesting entity. The outputting the safety status response to the requesting entity includes a processing module facilitating at least one of a variety of approaches. A first approach includes transmitting the safety status response on a control channel of a wireless communication network. A second approach includes transmitting the safety status response on a data channel of the wireless communication network. A third approach includes outputting the safety status response to a social network server for distribution (e.g., to the requesting entity or others in a social networking group). A fourth approach includes transmitting the safety status response to the requesting entity via at least one of the wireless communication network and the wireline communication network. A fifth approach includes transmitting the safety status response to an application server via at least one of the wireless communication network and the wireline communication network.

Figure 5:
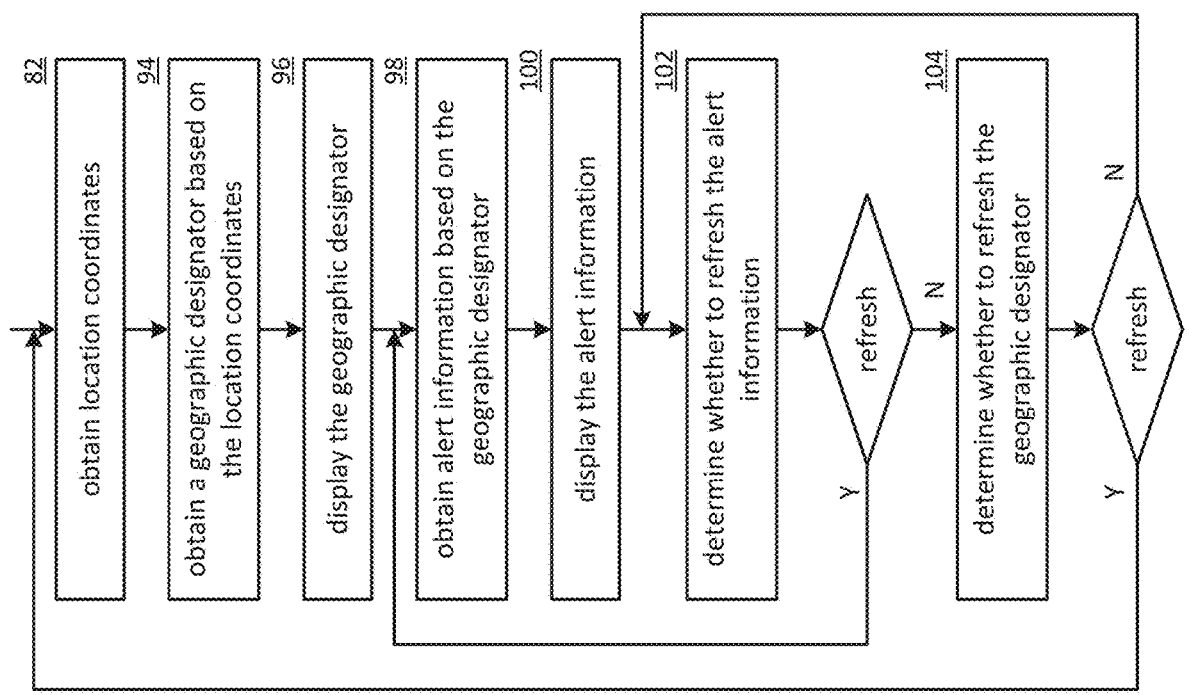
FIG. 5 is a flowchart illustrating an example of obtaining alert information in accordance with the present invention.

FIG. 5 is a flowchart illustrating an example of obtaining alert information, which includes similar steps to FIG. 4. The method begins with step 82 of FIG. 4 where a processing module (e.g., of a user device) obtains location coordinates. The location coordinates includes at least one of current location coordinates and last known location coordinates when current location coordinates are not available. The method continues at step 94 where the processing module obtains a geographic designator based on the location coordinates. The geographic designator includes at least one of a landmark identifier (ID), a building ID, a street address, a block ID, a neighborhood ID, a city ID, a village ID, a postal delivery code, a county ID, a parish ID, a state ID, a country ID, and a governmental level ID. The obtaining may be based on one or more of the local table lookup, a query to an information server, obtaining a route associated with user device, obtaining current location coordinates associated with at least one other user device associated with the user device (e.g., members a social network group), a query to the user device, and a query to another user device. For example, the processing module obtains a route that includes a first county ID and a second county ID, wherein the first county ID is associated with current location coordinates and the second county ID is associated with an expected next location coordinates (e.g., along a path of travel of the route)

The method continues at step 96 where the processing module displays the geographic designator. The display and includes at least one of displaying the geographic designator via a user interface output and sending the geographic designator to the user device. For example, processing module displays the first county ID and the second county ID. The method continues at step 98 where the processing module obtains alert information based on the geographic designator. The alert information includes at least one of weather information, emergency information, drill information, natural disaster information, Homeland security information, building evacuation information, city evacuation information, Amber alert information, citizen information, and business continuity information. The obtaining may be based on one or more of a query to an information server, a query to a social network server, and a query to a user device. For example, the processing module sends an alert information request that includes the geographic designator and/or the location coordinates to the information server and receives the alert information in response.

The method continues at step 100 where the processing module displays the alert information. The display and includes at least one of sending the alert information to a user interface output, sending the alert information to one or more user devices (e.g., a set of user device IDs), and sending the alert information to another user device, wherein the other user device is selected based on the location coordinates (e.g., close proximity). For example, processing module displays alert information associated with each of the first county ID, the second county ID, and a third county ID associated with another user device of a social network group that includes the user device.

The method continues at step 102 where the processing module determines whether to refresh the alert information. The determination may be based on one or more of the alert information, the location coordinates, the geographic designator, a time period threshold, and a time period since a last obtaining of the alert information. For example, the processing module determines to refresh the alert information when 10 minutes has passed since last obtaining alert information and a fixed time period threshold is 9 minutes. As another example, the processing module determines to refresh the alert information when 3 minutes has passed since last obtaining alert information and a variable time period threshold is 2 minutes based on the alert information indicating a tornado warning. As yet another example, the processing module determines to refresh the alert information when receiving a change in location comets associated with the other user device. The method branches to step 104 when the processing module determines to not refresh the alert information. The method loops back to step 98 when the processing module determines to refresh the alert information.

The method continues at step 104 where the processing module determines whether to refresh the geographic designator. The determination may be based on one or more of the alert information, the location coordinates, the geographic designator, the location coordinates history, a variable geographic designator time period threshold, a time period since last refreshing the alert information, receiving updated location coordinates associated with the other user device, and a time period since last refreshing the geographic designator. For example, the processing module determines a geographic designator time period threshold to be 1 minute when the location coordinates history indicates user device movement. As another example, the processing module determines a geographic designator time period threshold to be 10 minutes when the location coordinates history indicates no user device movement. The method repeats back to step 82 of FIG. 4 when the processing module determines to refresh the geographic designator. The method loops back to step 102 when the processing module determines not to refresh the geographic designator.

Figure 6:
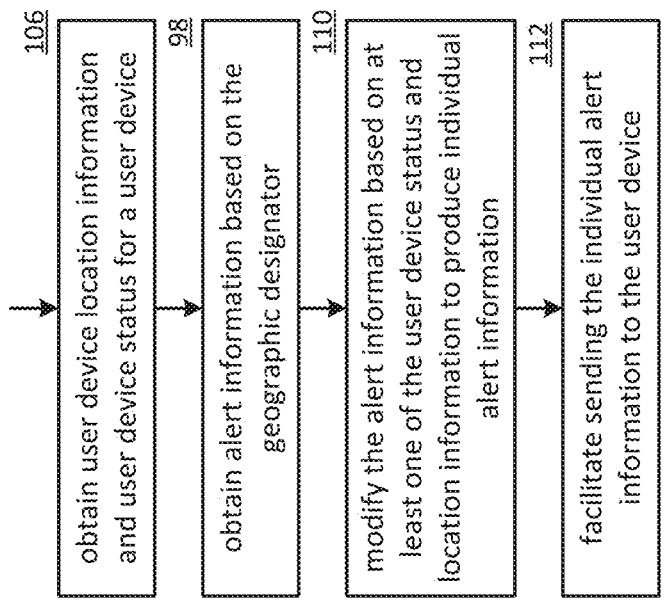
FIG. 6 is a flowchart illustrating an example of generating individual alert information in accordance with the present invention.

FIG. 6 is a flowchart illustrating an example of generating individual alert information, which includes similar steps to FIG. 5. The method begins at step 106 where a processing module (e.g., of an information server, of a social network server, of an application server) obtains user device location information and user device status corresponding to a user device. The user device location information includes at least one of location coordinates, a geographic designator, direction information, speed information, heading information, altitude information, direction history information, a route, and a navigation path. The obtaining may be based on one or more of a query of the user device, a lookup, a predetermination, interpreting previous location information of the user device, and receiving a message. The method continues with step 98 of FIG. 5 where the processing module obtains alert information based on the location information.

The method continues at step 110 where the processing module modifies the alert information based on at least one of the user device status and the location information to produce individual alert information. For example, the processing module includes alert information corresponding to an adjacent geographic designator based on the location information and the heading information. For instance, the processing module includes weather alert information corresponding to a next county on an interstate Highway that is aligned with a direction of travel.

The method continues at step 112 where the processing module facilitates sending the individual alert information to the user device. The facilitation includes at least one of transmitting the individual alert information to the user device, transmitting the individual alert information to another user device associated with substantially the same user device location information and user device status, storing the individual alert information, and responding to a subsequent query from a user device.

Figure 7:
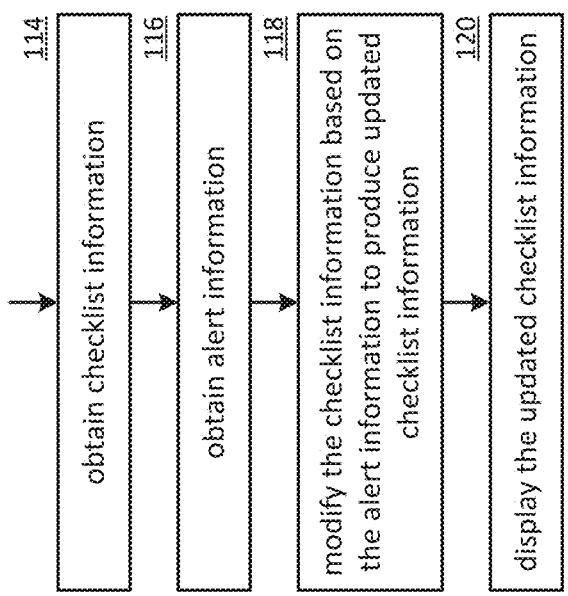
FIG. 7 is a flowchart illustrating an example of generating updated checklist information in accordance with the present invention.

FIG. 7 is a flowchart illustrating an example of generating updated checklist information. The checklist information includes at least one of a list of a plurality of items associated with emergency preparedness (e.g., a flashlight, matches, a blanket, water, food, etc.) and an availability indicator utilized to indicate whether a particular item of the plurality of items has been obtained. The method begins at step 114 where a processing module (e.g., of a user device) obtains the checklist information. The obtaining includes at least one of querying a user device, a lookup, predetermination, receiving a message, and receiving the checklist information. The method continues at step 116 where the processing module obtains alert information. The obtaining includes at least one of querying a user device, querying an information server, a predetermination, and receiving a message.

The method continues at step 118 where the processing module modifies the checklist information based on the alert information to produce updated checklist information. The modifying is based on one or more of a checklist modification to alert information table lookup and when a checklist entry compares unfavorably to a checklist entry associated with at least a portion of the alert information. The modifying includes one or more of highlighting one or more entries of the checklist, modifying a quantity associated with at least one entry the checklist, adding a new entry to the checklist, and deleting a previous entry from the checklist. For example, the processing module adds a new entry to the checklist that includes a flashlight when the alert information includes a likely power outage warning. As another example, the processing module modifies a quantity associated with flashlight batteries from 6 to 12 when the alert information includes the likely power outage warning. The method continues at step 120 where the processing module displays the updated checklist information. The displaying includes at least one of displaying the updated checklist information via a user interface output and sending the updated checklist information to one or more other user devices (e.g., of a social network group that includes the user device) for displaying (e.g., to a set of user IDs).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices, the method comprises:
   identifying a first user device potentially associated with a biohazard;
   identifying a geographic area associated with the biohazard based on previous location information of the first user device;
   estimating a time period of the biohazard based on one or more of:
      timing associated with interpreting a safety status level of the first user device generated by the first user device,
      timing associated with receiving a signal from a sensor device of the first user device, and
      timing associated with interpreting a second safety notification with regards to a second user device, wherein the second safety notification includes one or more of:
      a safety status level associated with the second user device, another geographic area associated with another biohazard, and previous location information of the second user device, wherein the second user device is potentially associated with the other biohazard;
   obtaining previous location information of a third user device by least one of:
      receiving the previous location information of the third user device from the third user device,
      estimating the previous location information of the third user device based on current location information of the third user device, and
      accessing an information server to recover the previous location information of the third user device;
   identifying the third user device as potentially associated with the biohazard based on the geographic area associated with the biohazard and the previous location information of the third user device when at least some of location coordinates history of the third user device for the time period of the biohazard is within the geographic area associated with the biohazard, wherein the previous location information of the third user device includes the location coordinates history of the third user device; and
   issuing a safety notification to the third user device, wherein the safety notification includes one or more of the geographic area associated with the biohazard, a safety status request, the safety status level of the first user device, a subset of the previous location information of the first user device, and a subset of the previous location information of the third user device.

2. The method of claim 1 further comprises:
   identifying a fourth user device potentially associated with the biohazard based on the previous location information of the third user device and previous location information of the fourth user device.

3. The method of claim 1, wherein the identifying the first user device potentially associated with the biohazard comprises one or more of:
   interpreting the safety status level of the first user device generated by the first user device;
   querying a server with regards to the safety status level of the first user device;
   interpreting a schedule adherence deviation indicator for the first user device;
   interpreting the signal from the sensor device of the first user device; and
   interpreting the second safety notification with regards to the second user device.

4. The method of claim 1, wherein the identifying the geographic area associated with the biohazard based on the previous location information of the first user device comprises:
   obtaining the previous location information of the first user device; and
   extracting location coordinates history of the first user device for the time period of the biohazard from the previous location information of the first user device to produce the geographic area associated with the biohazard.

5. The method of claim 1, wherein the identifying the third user device as potentially associated with the biohazard further comprises:
   extracting the location coordinates history of the third user device for the time period of the biohazard from the previous location information of the third user device.

6. The method of claim 1, wherein the issuing the safety notification to the third user device comprises one or more of:
   obtaining the safety status level of the first user device;
   identifying a portion of the previous location information of the third user device that is within the geographic area associated with the biohazard to produce the subset of the previous location information of the third user device;

identifying a portion of the previous location information of the first user device that is within the subset of the previous location information of the third user device to produce the subset of the previous location information of the first user device;

generating the safety notification to include one or more of: the geographic area associated with the biohazard, the safety status request, the safety status level of the first user device, the subset of the previous location information of the first user device, and the subset of the previous location information of the third user device; and sending the safety notification to the third user device.

7. A computing device comprises:

an interface;

a memory; and a processing module operably coupled to the interface and the memory, wherein the processing module performs functions to:

identify a first user device potentially associated with a biohazard;

identify a geographic area associated with the biohazard based on previous location information of the first user device;

estimate a time period of the biohazard based on one or more of:

timing associated with interpreting a safety status level of the first user device generated by the first user device, timing associated with receiving a signal from a sensor device of the first user device, and timing associated with interpreting a second safety notification with regards to a second user device, wherein the second safety notification includes one or more of: a safety status level associated with the second user device, another geographic area associated with another biohazard, and previous location information of the second user device, wherein the second user device is potentially associated with the other biohazard;

obtain previous location information of a third user device by least one of:

receiving the previous location information of the third user device from the third user device, estimating the previous location information of the third user device based on current location information of the third user device, and accessing an information server to recover the previous location information of the third user device;

identify the third user device as potentially associated with the biohazard based on the geographic area associated with the biohazard and the previous location information of the third user device when at least some of location coordinates history of the third user device for the time period of the biohazard is within the geographic area associated with the biohazard, wherein the previous location information of the third user device includes the location coordinates history of the third user device; and issue, via the interface, a safety notification to the third user device, wherein the safety notification includes one or more of the geographic area associated with the biohazard, a safety status request, the safety status level of the first user device, a subset of the previous location information of the first user device, and a subset of the previous location information of the third user device.

8. The computing device of claim 7, wherein the processing module further performs functions to:

identify a fourth user device potentially associated with the biohazard based on the previous location information of the third user device and previous location information of the fourth user device.

9. The computing device of claim 7, wherein the processing module performs functions to identify the first user device potentially associated with the biohazard by one or more of:

interpreting the safety status level of the first user device generated by the first user device;

querying a server with regards to the safety status level of the first user device;

interpreting a schedule adherence deviation indicator for the first user device;

interpreting the signal from the sensor device of the first user device; and interpreting the second safety notification with regards to the second user device.

10. The computing device of claim 7, wherein the processing module performs functions to identify the geographic area associated with the biohazard based on the previous location information of the first user device by:

obtaining the previous location information of the first user device; and extracting location coordinates history of the first user device for the time period of the biohazard from the previous location information of the first user device to produce the geographic area associated with the biohazard.

11. The computing device of claim 7, wherein the processing module further performs functions to identify the third user device as potentially associated with the biohazard by:

extracting the location coordinates history of the third user device for the time period of the biohazard from the previous location information of the third user device.

12. The computing device of claim 7, wherein the processing module performs functions to issue the safety notification to the third user device by one or more of:

obtaining, via the interface, the safety status level of the first user device;

identifying a portion of the previous location information of the third user device that is within the geographic area associated with the biohazard to produce the subset of the previous location information of the third user device;

identifying a portion of the previous location information of the first user device that is within the subset of the previous location information of the third user device to produce the subset of the previous location information of the first user device;

generating the safety notification to include one or more of: the geographic area associated with the biohazard, the safety status request, the safety status level of the first user device, the subset of the previous location information of the first user device, and the subset of the previous location information of the third user device; and sending, via the interface, the safety notification to the third user device.

\* \* \* \* \*